Nov. 20, 1945.  E. A. STALKER  2,389,170
ROTARY WING AIRCRAFT
Filed Oct. 18, 1941
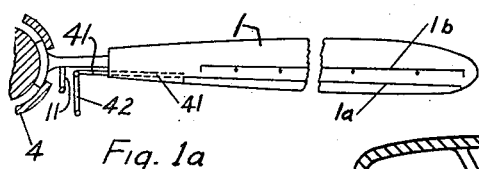
Fig. 1a
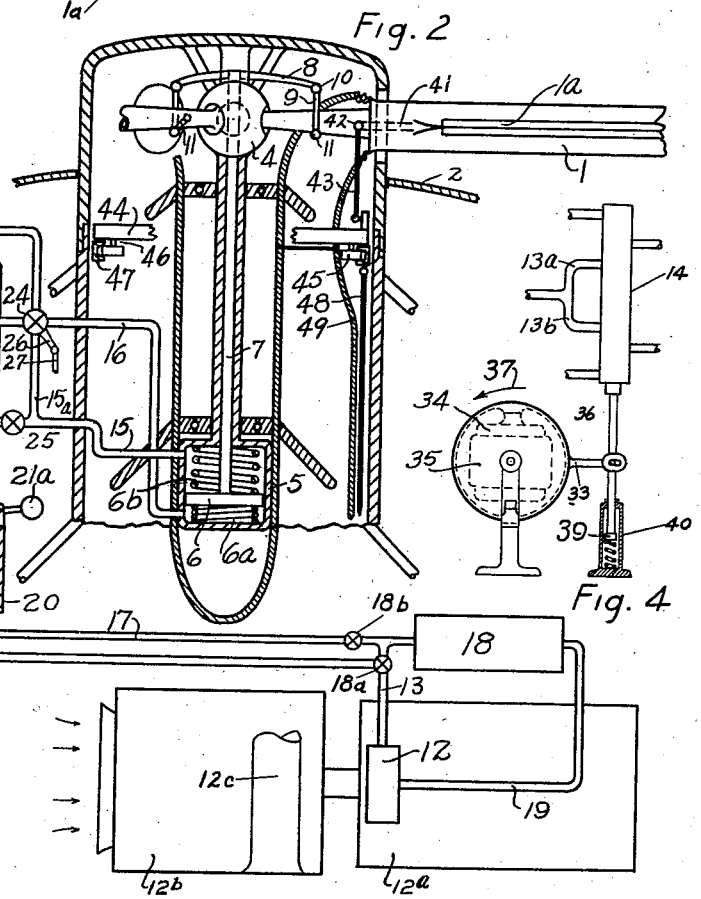
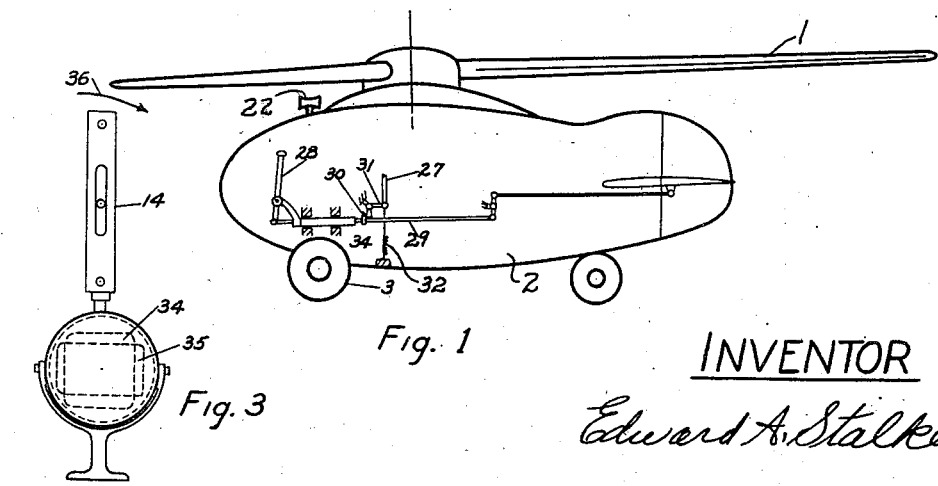
INVENTOR
Edward A. Stalker Patented Nov. 20, 1945

2,389,170

UNITED STATES PATENT OFFICE 2,389,170

ROTARY WING AIRCRAFT

Edward A. Stalker, Ann Arbor, Mich.

Application October 18, 1941, Serial No. 415,502

14 Claims. (Cl. 244—17)

My invention relates to aircraft supported by a rotating wing and has for its objects first to provide a means of controlling the vertical travel of the aircraft; second to provide a means of changing the lift of the wings substantially symmetrically to provide a means of changing the pitch as a function of the engine's operation. Other objects will appear from the description and drawing.

When a hovering aircraft begins to move horizontally it starts to climb unless the pitch or rate of rotation of the lifting blade is reduced. The reason for this is that in the hovering state the rotating blade is in a downflow induced by its lift while if it moves horizontally it impels new air downward which has not yet acquired a downward motion of much magnitude. Hence the effective angles of attack of the blades are increased by the horizontal displacement of the machine. It is desirable that a machine should behave consistently relative to the controls. If a push forward on the control column normally increases the forward speed, it should do only this when the stick is pushed forward after hovering.

It is one of the features of this invention that when leaving the hovering condition the tendency to climb is eliminated.

The objects of this invention are accomplished by the means set forth in the accompanying drawing in which:

Figure 1 is a side elevation of the aircraft;

Figure 1a is a plan view of a wing;

Figure 2 is a fragmentary section of Figure 1 in the plane of the paper;

Figure 3 is a side elevation of an alternate speed sensitive device to operate the valve 14; and Figure 4 is an end view of the mechanism of Figure 3.

In Figures 1 and 2 the blades or wings are 1, the fuselage is 2 and the landing gear is 3. The wings are supported in the ball socket 4. The ends of the wings and the ball socket constitute a ball and socket joint for each wing which is not only free to oscillate vertically under the action of the wind and inertia forces but also to rotate in the ball socket. This rotation is accomplished by the cylinder 5 and piston 6. The piston rod 7 carries the cross rod 8 to which connecting rods 9 are attached by joints 10. At their lower end these attach to levers 11 extending outward from the wings. The piston 6 is moved by fluid pressure supplied by the pump 12 on the engine 12a through the tube 13 having the branches 13a and 13b. The fluid flows through the piston valve 14 and to the cylinder 5 by way of one of the tubes 15 or 16 depending upon which way piston 6 is to be moved. A suitable return duct 17 leads to the reservoir 18 from which the pump draws by means of pipe 19. There is a relief valve 18a to direct fluid to 18 if the pressure rises too high. Check valve 18b permits fluid to return to 18 but excludes a flow in the reverse direction.

The valve 14 is controlled by the cylinder 20 and piston 21 which is moved by the suction from the venturi 22 or by the spring 23.

If the airplane is hovering there is no flow through the venturi and the spring 23 pushes the piston 21 down. The valve 14 is then arranged so that fluid passes through tube 15 to the top of cylinder 5, pushing piston 6 downward and increasing the pitch of the wings equally. Fluid is displaced from the lower side of cylinder 5 through tube 16 and valve 14 to the reservoir 18.

As the aircraft starts moving forward the flow through the venturi creates a suction which is transmitted to the piston 21 lifting it up and putting valve 14 in the dotted position. This motion sends the flow through the valve 14 via tube 16 and causes the piston 6 to rise and decrease the pitch of the wings 1.

If the engine fails or is throttled the pressure in the line 13 is relieved and the springs 6a and 6b center the piston 6 in the cylinder 5 thereby reducing the pitch of the wings to the autorotative state desired for landing.

Although I prefer to make the fluid pressure dependent on the operation of the engine this is not an essential feature for changing the pitch of the wings when leaving the hovering state.

If the pilot wishes to increase the pitch as very high forward speeds are sought he turns the four-way valve 24 so that the pressure from tube 13a is diverted to tube 15 and the top of cylinder 5 instead of through 16 to the bottom of the cylinder. It is to be remembered that 14 is in the dotted position. A check valve 25 prohibits the pressure in 15 from escaping through valve 14 to the return tube 17a. This valve 25 however will not stop a flow from 17a to 15 through valve 14 when its pistons are in the dotted position. Thus the bottom of cylinder 5 can always be evacuated when the piston 6 is forced down. The four-way valve 24 permits evacuation when the check valve 25 stops fluid entering 14.

If the engine should fail while the valve 24 is diverting the pressure to the top of the cylinder 5 (high pitch condition) the pressure would of course disappear and the piston 6 would be centered by its springs, giving the best autorotative state for landing.

The valve 24 has the arm 26 and to it is connected the rod 27 which preferably is actuated by the stick 28 which moves the push tube 29 forcing its lug 30 against the leg of the bellcrank 31. Thus the stick only influences the valve 24 when it has been pushed forward past a certain range in the forward direction. For other positions the valve 24 position is set by the spring 32 attached to the leg of the bell-crank 31. Thus when the stick is near its center position the venturi is in complete control.

The counterweight 21a serves to balance the weight of the piston 21 and the pistons of valve 14 so that vertical accelerations of the airplane will not affect the functioning of these parts.

In another form of the invention I use a gyroscope to govern the valve 14. When the aircraft is changed from the hovering attitude to the forward travel it is pitched forward. This rotation will cause a gyroscope to precess and operate the valve 14.

In Figures 3 and 4 the valve 14 is connected to an arm 33 fixed to the case of electric motor 34. The armature 35 of this motor constitutes a gyroscope and when the airplane is rotated in the direction of the arrow 36 in Figure 3 the gyroscope precesses in the direction of the arrow 37, that is at right angles to the direction 36 according to the well known law of gyroscopes. The precession of the gyroscope adjusts valve 14 to send fluid to the bottom of cylinder 5, Figure 2, whereby the pitch of the wings is decreased. A damping piston 39 in cylinder 40 is attached to the arm 33 to smooth the precessional motion and avoid jerkiness in operation. The spring 30 gradually restores the gyroscope to the normal attitude, allowing time for the pilot to alter the attitude of the aircraft for horizontal flight.

The gyroscope, when tilted, precesses because of the inertia of its particles and hence, is in fact an inertia element.

The means of controlling the blades is shown in Figure 2. The wings have flaps 1a with torque shafts 41 running into the hub where an arm 42 projects at right angles. To this is attached the rod 43 and at its lower end it is attached to the ring 44. This ring turns with the hub and wings. It has four roller or ball bearings 45 mounted on shafts 46 fixed to ring 44. The races of these bearings bear inside the groove of the stationary ring 47. It is tiltable by means of the control rod 48 which is connected to a suitable manual control as illustrated in my other patents such as U. S. Patent No. 2,084,464.

The lifting rotor comprised of the three blades is rotated by the air discharged from the blade slots 1b. The air is supplied from the blower 12b driven by the engine 12a. The air leaves the blower through the duct 12c which is connected to the duct 49 as described in my previous patents.

There is another control rod 90 degrees away from 48 to control the tilt of the ring at right angles to the motion induced by rod 48.

While I have illustrated a specific form of the invention it is to be understood that I do not limit myself to this exact form but intend to claim my invention broadly as set forth in the appended claims.

I claim:

1. In combination in an aircraft, a wing, means to support the wing for rotation about an upright axis, means providing for the rotation of the wing about a spanwise axis to change its pitch angle, a device sensitive to substantially the horizontal speed of the aircraft, and means controlled by said device and responsive to an increase in said horizontal speed to decrease the mean pitch angle of the wing.

2. In combination in an aircraft, a wing, means to support the wing for rotation about an upright axis, means providing for the rotation of the wing about a spanwise axis to change its pitch angle, a device sensitive to substantially the forward speed of the aircraft, and means controlled by said device and responsive to an increase in said forward speed to effect a decrease in the mean pitch angle of the wing.

3. In combination in an aircraft, a wing, means for supporting said wing for rotation about a substantially upright axis, means providing for rotation of said wing about a spanwise axis to alter the pitch of the wing, a device having an inertia element sensitive to a change of motion of the aircraft, and means operably interconnecting said pitch change means and said device so that the pitch angle of the wing is decreased in response to a downward rotation of the nose of the aircraft.

4. In combination in an aircraft, a wing mounted for rotation about an upright axis, means for producing non-orbital changes in the lift of said wing and in the same sense when on opposite sides of said axis, a device sensitive to a change in the motion of the aircraft transverse to said upright axis, and means controlled by said device and responsive to a change in said transverse motion for actuating said lift varying means to change the lift of said wing.

5. In combination in an aircraft, a wing, means to support the wing for rotation about an upright axis, means providing for the rotation of the wing about a spanwise axis to change its pitch angle, means responsive to a change in the forward speed of the aircraft, and means controlled by said last named means for actuating said pitch change means to effect a change in the mean pitch angle of said wing in the sense opposite to that of the change in forward speed to reduce the tendency of the aircraft to climb upon moving forward following hovering.

6. The combination of claim 5 in which said means responsive to change in the forward speed of the aircraft comprises a Venturi device.

7. The combination of claim 5 in which said means responsive to change in the forward speed of the aircraft comprises a gyroscopic device.

8. In combination in an aircraft, a wing, means to support the wing for rotation about an upright axis, means providing for the rotation of the wing about a spanwise axis to change its pitch angle including a hydraulic power unit, a source of fluid pressure, means responsive to a change in the forward speed of said aircraft, means controlled by said last named means for controlling said hydraulic unit to produce operation thereof in the sense to decrease the mean pitch angle of said wing upon increase in said forward speed, and additional manual means for reversing the operation of said hydraulic unit during forward flight to increase the mean pitch angle of said wing for increased forward speed.

9. In combination on an aircraft, a fuselage, a wing, means for supporting said wing on said fuselage for rotation about an upright axis and for adjustment about a spanwise axis for altering the pitch angle of the wing, said wing having a slot adapted to discharge a propulsive jet therefrom, means for developing air pressure for application to said slot to establish said jet, an engine operably connected to said air pressure means for operating the same, and means responsive to a reduction in the speed of said engine to a predetermined value independently of the speed of rotation of said wing for reducing the pitch of said wing.

10. In combination on an aircraft, a fuselage, a wing, means for supporting said wing on said fuselage for rotation about an upright axis and for adjustment about a spanwise axis for altering the pitch angle of the wing, said wing having a slot adapted to discharge a propulsive jet therefrom, means for developing air pressure for application to said slot to establish said jet, an engine operably connected to said air pressure means for operating the same, and means responsive to a reduction in the speed of said engine to a predetermined value for altering the pitch of said wing to reduce said pitch substantially to the autorotative state.

11. In combination in an aircraft, a fuselage, a wing, means for supporting said wing on said fuselage for rotation about an upright axis and for adjustment about a spanwise axis for altering the pitch angle of the wing, means for changing the pitch of said wing, an engine for rotating said wing, fluid pressure means actuated from said engine for supplying fluid pressure for the operation of said pitch changing means, and means responsive to the forward travel of said aircraft following hovering for operating said pitch changing means to reduce the pitch of said wing.

12. In combination in an aircraft, a fuselage, a wing, means for supporting said wing on said fuselage for rotation about an upright axis and for adjustment about a spanwise axis for altering the pitch angle of the wing, means for changing the pitch of said wing, an engine for rotating said wing, fluid pressure means actuated from said engine for supplying fluid pressure for the operation of said pitch changing means, valve means for controlling the application of said fluid pressure providing for increasing the pitch of the wing while the aircraft is hovering, and means responsive to the forward travel of the aircraft following hovering for operating said valve means to reduce the pitch of said wing.

13. In combination in an aircraft, a wing mounted for rotation about an upright axis, means for producing non-orbital changes in the lift of said wing and in the same sense when on opposite sides of said axis, a device sensitive to a change in the motion of the aircraft transverse to said upright axis, and means controlled by said device and responsive to an increase in said transverse motion for actuating said lift varying means to decrease the lift of the wing to maintain substantially horizontal flight conditions following hovering.

14. The combination as recited in claim 13 including additional means for reversing the operation of said lift varying means during forward flight to effect non-orbital increase in the lift of said wing in the same sense when on opposite sides of said axis for increased forward speed.

EDWARD A. STALKER.